US011247634B2

(12) United States Patent
Bierwirth

(10) Patent No.: US 11,247,634 B2
(45) Date of Patent: Feb. 15, 2022

(54) HYBRID INFLATOR, AIRBAG UNIT AND VEHICLE SAFETY SYSTEM COMPRISING SUCH HYBRID INFLATOR AS WELL AS METHOD OF FORMING A SHOCK WAVE

(71) Applicant: TRW Airbag Systems GmbH, Aschau am Inn (DE)

(72) Inventor: Sebastian Bierwirth, Rechtmehring (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 160 days.

(21) Appl. No.: 15/440,244

(22) Filed: Feb. 23, 2017

(65) Prior Publication Data
US 2017/0259775 A1 Sep. 14, 2017

(30) Foreign Application Priority Data
Mar. 11, 2016 (DE) .................. 10 2016 002 937.4

(51) Int. Cl.
*B60R 21/272* (2006.01)
*B60R 21/274* (2011.01)
(Continued)

(52) U.S. Cl.
CPC ........ *B60R 21/272* (2013.01); *B60R 21/2644* (2013.01); *B60R 21/274* (2013.01); *B60R 2021/26029* (2013.01)

(58) Field of Classification Search
CPC . B60R 21/272; B60R 21/274; B60R 21/2644; B60R 21/26029
See application file for complete search history.

(56) References Cited

U.S. PATENT DOCUMENTS 5,615,912 A * 4/1997 O'Loughlin .......... B60R 21/272
102/531
5,634,661 A * 6/1997 Dahl ..................... B60R 21/272
280/737
(Continued)

FOREIGN PATENT DOCUMENTS

DE 102011013548 9/2012
DE 102013110810 2/2015

*Primary Examiner* — Barry Gooden, Jr.
(74) *Attorney, Agent, or Firm* — Tarolli, Sundheim, Covell & Tummno LLP

(57) ABSTRACT

The invention relates to a hybrid inflator especially for a vehicle safety system, comprising an igniter (10), a combustion chamber (16) including a propellant charge (18) which is separated from the igniter (10) by a first bursting element (14) held by a bursting element holder (13), and comprising a compressed gas tank (20) filled with compressed gas and having at feast one discharge opening, the discharge opening being closed by a second bursting element (24) and the compressed gas tank (20) being fluid-communicated with the combustion chamber (16) so that the compressed gas surrounds the propellant charge (18). The invention excels by the fact that the bursting element holder (13) at least in portions delimits an ignition chamber (30) containing a booster charge (15), wherein a shock wave (SW) for opening the second bursting element (24) can be formed only when both the igniter (10) and the booster charge (15) have been ignited and, respectively, activated. The invention further deals with an airbag unit and a vehicle safety system comprising said hybrid inflator or said airbag unit. Moreover, the invention states a method of forming a shock wave within a hybrid inflator.

17 Claims, 2 Drawing Sheets

(51) Int. Cl.
  *B60R 21/264*  (2006.01)
  *B60R 21/26*  (2011.01)

(56)  References Cited

U.S. PATENT DOCUMENTS

| | | | | |
|---|---|---|---|---|
| 5,813,694 | A * | 9/1998 | Jeong | B60R 21/217 |
| | | | | 280/737 |
| 5,821,448 | A * | 10/1998 | Hamilton | B60R 21/272 |
| | | | | 102/288 |
| 5,890,735 | A * | 4/1999 | Smith | B60R 21/272 |
| | | | | 102/531 |
| 6,019,389 | A * | 2/2000 | Burgi | B60R 21/264 |
| | | | | 280/736 |
| 6,042,146 | A * | 3/2000 | Bauer | B60R 21/272 |
| | | | | 280/737 |
| 6,065,774 | A * | 5/2000 | Cabrera | B01D 39/12 |
| | | | | 149/36 |
| 6,382,668 | B1 * | 5/2002 | Goetz | B60R 21/264 |
| | | | | 280/737 |
| 6,601,872 | B2 * | 8/2003 | Zimbrich | B60R 21/272 |
| | | | | 280/737 |
| 6,874,814 | B2 * | 4/2005 | Hosey | B60R 21/272 |
| | | | | 280/737 |
| 7,246,819 | B2 * | 7/2007 | Hofmann | B60R 21/239 |
| | | | | 280/735 |
| 7,431,337 | B2 * | 10/2008 | Matsuda | F42B 3/045 |
| | | | | 102/202 |
| 7,828,324 | B2 * | 11/2010 | Herget | B60R 21/272 |
| | | | | 280/737 |
| 7,883,108 | B2 | 2/2011 | Robinette et al. | |
| 8,052,169 | B2 * | 11/2011 | Yano | B60R 21/272 |
| | | | | 280/737 |
| 9,321,426 | B1 * | 4/2016 | Krupp | B60R 21/264 |
| 2003/0034641 | A1 * | 2/2003 | Zimbrich | B60R 21/272 |
| | | | | 280/741 |
| 2003/0230881 | A1 * | 12/2003 | Hosey | B60R 21/272 |
| | | | | 280/737 |
| 2003/0230882 | A1 * | 12/2003 | Hosey | B60R 21/272 |
| | | | | 280/737 |
| 2004/0021306 | A1 * | 2/2004 | Lell | B01D 45/06 |
| | | | | 280/736 |
| 2004/0066024 | A1 * | 4/2004 | Shioji | B60R 21/261 |
| | | | | 280/741 |
| 2005/0189750 | A1 * | 9/2005 | Gotoh | B60R 21/272 |
| | | | | 280/737 |
| 2005/0275203 | A1 * | 12/2005 | Yano | B60R 21/272 |
| | | | | 280/737 |
| 2005/0280251 | A1 * | 12/2005 | Yano | B60R 21/272 |
| | | | | 280/736 |
| 2006/0055160 | A1 * | 3/2006 | Cook | B60R 21/272 |
| | | | | 280/741 |
| 2006/0113780 | A1 * | 6/2006 | Goetz | B60R 21/272 |
| | | | | 280/736 |
| 2006/0201572 | A1 * | 9/2006 | Matsuda | F17C 5/06 |
| | | | | 141/1 |
| 2006/0202455 | A1 * | 9/2006 | Matsuda | B60R 21/272 |
| | | | | 280/736 |
| 2006/0255577 | A1 * | 11/2006 | Nakayasu | B60R 21/268 |
| | | | | 280/737 |
| 2007/0085309 | A1 * | 4/2007 | Kelley | B60R 21/272 |
| | | | | 280/736 |
| 2008/0023948 | A1 * | 1/2008 | Kitayama | B60R 21/272 |
| | | | | 280/736 |
| 2008/0069740 | A1 * | 3/2008 | Kitayama | B60R 21/272 |
| | | | | 422/163 |
| 2008/0136153 | A1 * | 6/2008 | Yamashita | B60R 21/261 |
| | | | | 280/736 |
| 2008/0142127 | A1 * | 6/2008 | Kitayama | B60R 21/272 |
| | | | | 149/75 |
| 2009/0051152 | A1 * | 2/2009 | Yamashita | B21D 39/06 |
| | | | | 280/743.1 |
| 2009/0108572 | A1 * | 4/2009 | Smith | B60R 21/2644 |
| | | | | 280/737 |
| 2011/0018243 | A1 * | 1/2011 | Yano | B60R 21/272 |
| | | | | 280/741 |
| 2012/0079959 | A1 * | 4/2012 | Chen | B60R 21/272 |
| | | | | 102/530 |
| 2012/0187667 | A1 * | 7/2012 | Jung | B60R 21/272 |
| | | | | 280/737 |
| 2014/0090572 | A1 * | 4/2014 | Nakashima | B60R 21/264 |
| | | | | 102/363 |
| 2014/0239623 | A1 * | 8/2014 | Tokuda | B60R 21/272 |
| | | | | 280/737 |
| 2015/0158455 | A1 * | 6/2015 | Ruckdeschel | B60R 21/264 |
| | | | | 280/741 |
| 2017/0166162 | A1 * | 6/2017 | Last | B60R 21/264 |
| 2017/0282844 | A1 * | 10/2017 | Kobayashi | B60R 21/274 |
| 2017/0341620 | A1 * | 11/2017 | Kobayashi | B60R 21/272 |
| 2018/0141514 | A1 * | 5/2018 | Last | B60R 21/2644 |

* cited by examiner

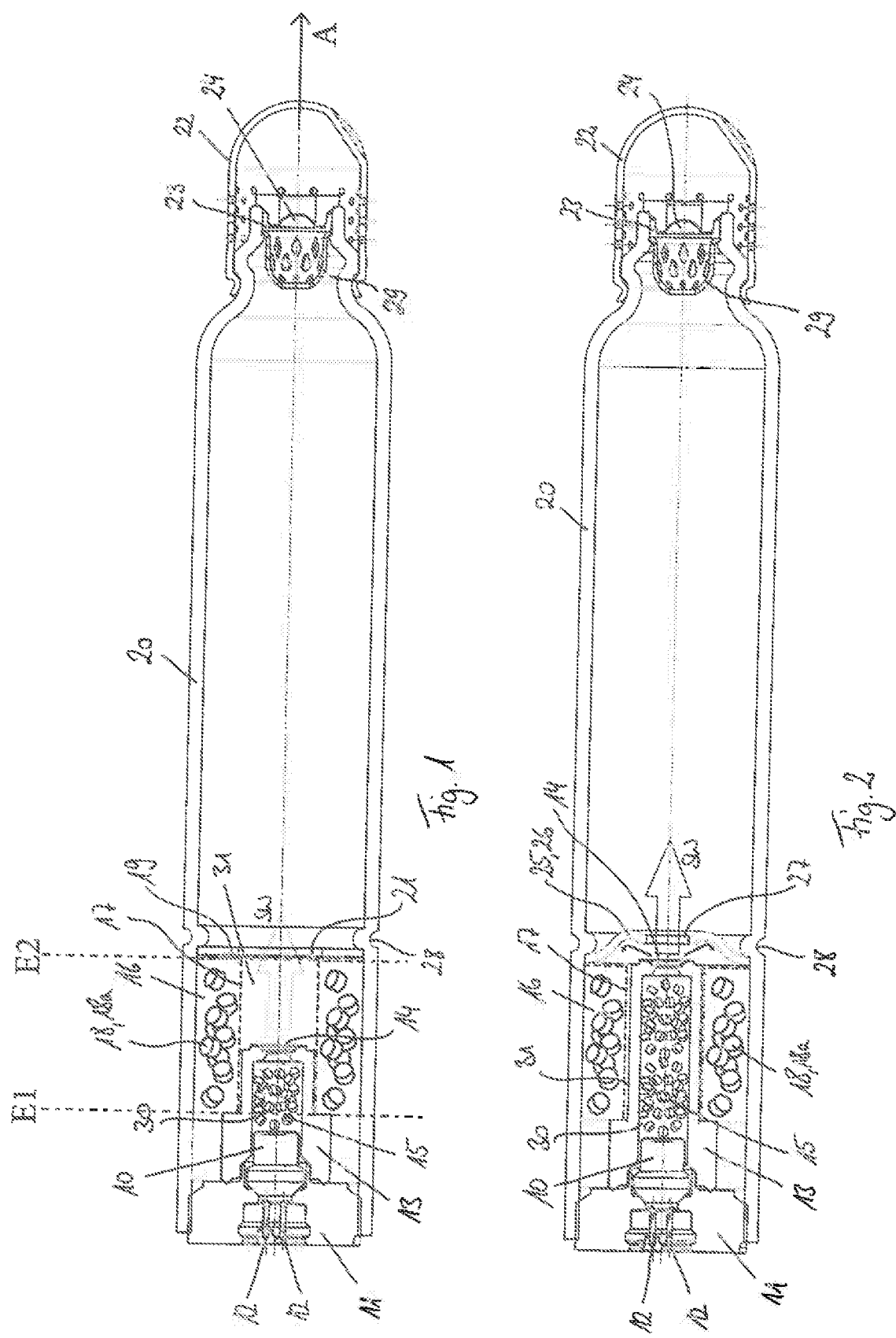

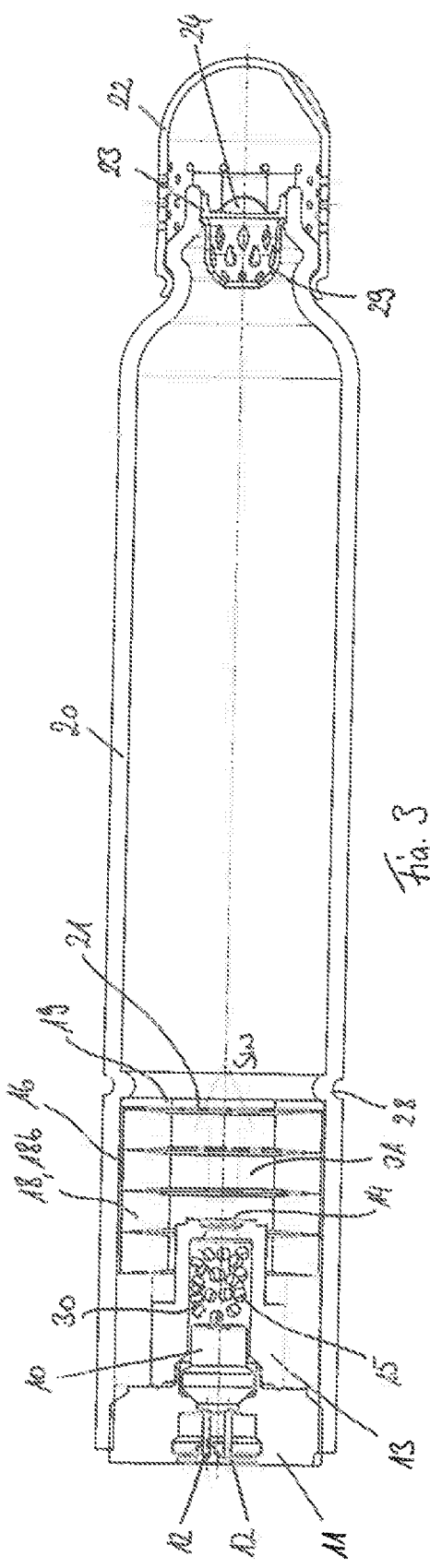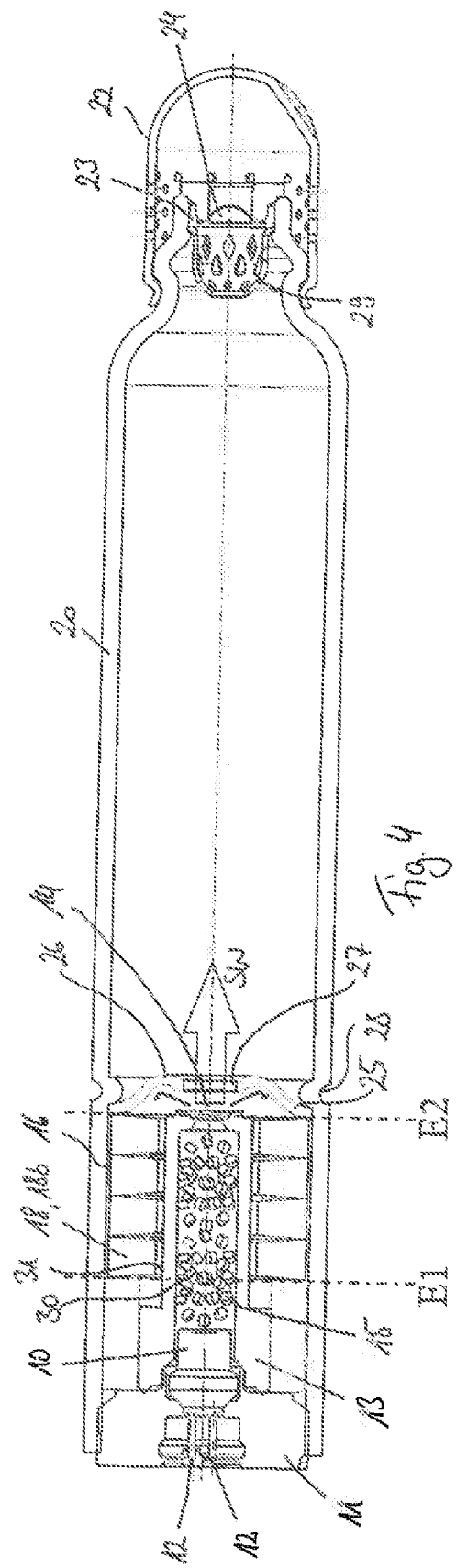

HYBRID INFLATOR, AIRBAG UNIT AND VEHICLE SAFETY SYSTEM COMPRISING SUCH HYBRID INFLATOR AS WELL AS METHOD OF FORMING A SHOCK WAVE

RELATED APPLICATION

This application claims priority from German Patent Application No. 10 2016 002 937.4, filed Mar. 11, 2016, the subject matter of which is incorporated herein by reference.

BACKGROUND OF THE INVENTION

The invention relates to a hybrid inflator, especially for a vehicle safety system, according to the preamble of claim 1. In addition, the invention relates to an airbag unit and a vehicle safety system comprising such hybrid inflator. The invention also relates to a method of forming a shock wave within a hybrid inflator.

A hybrid inflator of the afore-mentioned type is known, for example, from U.S. Pat. No. 7,883,108 B2. The known hybrid inflator comprises a compressed gas tank including an igniter. The igniter is partially surrounded by a cap which, upon activation of the igniter, is opened on its end face in the direction of an axial longitudinal direction. A propellant charge in a combustion chamber is arranged axially downstream of the cap. Opposed to the igniter along the longitudinal axis, a bursting disk that closes an outlet opening for gas is provided.

When the known hybrid inflator is triggered, the cap which is partially surrounding the igniter and which constitutes a first bursting element is ruptured or opened due to the increase in pressure in the igniter. In this way, a shock wave is formed which propagates centrally through a propellant charge disposed in the combustion chamber. The shock wave thus passes through the propellant charge and subsequently arrives at the bursting disk that acts as a second bursting element. The bursting disk yields to the shock wave and thus opens the outlet opening for gas. In this way, compressed gas as well as gas additionally generated by the propellant charge may exit the compressed gas tank and may fill an airbag, for example.

One drawback of the known hybrid inflator is the overall size thereof. Especially the cross-sectional diameter of the known hybrid inflator is comparatively large as the combustion chamber projects tar into the compressed gas tank. It is another drawback that relatively high pressure is necessary to break the first bursting element, namely the cap. Therefore, a highly charged igniter containing a large amount of pyrotechnical charge is necessary which requires increased safety efforts during manufacture. Finally, the selection of material for the propellant charge is limited, as the pyrotechnical charge has to be ensured to reliably cause ignition of the propellant charge in the igniter.

SUMMARY OF THE INVENTION

It is the object of the invention to state a hybrid inflator having a compact structure. Moreover, a hybrid inflator which is easy to adjust to different requirements of use is desirable. It is another object of the invention to state an airbag unit and a vehicle safety system comprising such hybrid inflator. Furthermore, the invention is intended to provide a method of forming a shock wave within a hybrid inflator.

This object is achieved with respect to the hybrid inflator by the subject matter of the claims 1 or 2 or 3, with respect to the airbag unit by the subject matter of claim 9, with respect to the vehicle safety system by the subject matter of claim 10 and with respect to the method by the subject matter of claim 11.

Hence, the invention is based on the idea to provide a hybrid inflator especially for a vehicle safety system. The hybrid inflator includes an igniter, a combustion chamber containing propellant charge which is separated from the igniter by a first bursting element retained by a bursting element holder, and a compressed gas tank filled with compressed gas which includes at least one discharge opening, the discharge opening being closed by a second bursting element. The compressed gas tank is fluid-communicated with the combustion chamber so that the compressed gas surrounds the propellant charge. In accordance with the invention, the bursting element holder at least in portions delimits an ignition chamber containing a booster charge, wherein a shock wave for opening the second bursting element can only be formed when both the igniter and the booster charge are ignited and, respectively, activated, in particular, the booster charge may be provided as a component separate from the preferably prefabricated igniter.

The concept of the invention substantially is to influence the triggering and, respectively, formation of the shock wave, especially to initiate the same at a predetermined position inside the hybrid inflator. In contrast to the state of the art according to U.S. Pat. No. 7,883,108 B2, the shock wave is not initiated by solely triggering the igniter. Rather, an additional booster charge is provided which has to be ignited so that a shock wave will actually form. Concretely speaking, the shock wave is provided to be formed only when the igniter and the booster charge are imperatively ignited.

The shock wave is triggered after ignition of the igniter and of the booster charge. Since the shock wave will not form before the booster charge has been ignited, opening of the second bursting element is delayed. This delay may cause higher pressure to be built up inside the pressure tank, which may accelerate the filling of an airbag. At the same time, the overall size of the hybrid inflator may be reduced, as upon burn-off the booster charge provides additional gas volume.

Alternatively or additionally to the delayed formation of a shock wave, in the afore-described hybrid inflator the first bursting element may be arranged so that the shock wave adapted to be triggered by the igniter and the booster charge can be initiated and, respectively, triggered in the axial longitudinal direction of the hybrid inflator between a first plane delimiting the propellant charge at its end facing the igniter and a second plane delimiting the propellant charge at its end facing away from the igniter.

Accordingly, the axial longitudinal direction of the hybrid inflator is defined so that it extends from a first end of the hybrid inflator at which the igniter is located to a second opposite end at which a diffusor including discharge openings of the hybrid inflator is located.

Moreover, as an alternative or in addition to the time-delayed formation of a shock wave, in the afore-described hybrid inflator the first bursting element may be arranged so that the shock wave to be triggered by the igniter and the booster charge can be initiated and, respectively, triggered in the axial longitudinal direction of the hybrid inflator only downstream of the propellant charge or starting from a second plane delimiting the propellant charge at its end facing away from the igniter.

This aspect of the invention is backed by the idea to trigger the shock wave as late as at the longitudinally axial end of the propellant charge or behind or, respectively, downstream of the propellant charge. Thus, the shock wave is triggered locally behind the propellant charge.

This aspect of the invention substantially differs from the state of the art according to U.S. Pat. No. 7,883,108 B2 by the fact that the shock wave is generated behind the propellant charge in so far as the shock wave no longer needs to propagate through a central opening of the propellant charge. This prevents the shock wave from being influenced by starting burn-off of the propellant change.

In a preferred embodiment of the hybrid inflator according to the invention, the bursting element holder with the first bursting element and at least one end face of the igniter define a or, respectively, the ignition chamber in which the booster charge preferably being surrounded by atmospheric pressure is accommodated. Hence in a simple way a separate ignition chamber can be formed in which the booster charge may be arranged separately from the preferably prefabricated igniter. When the booster charge is surrounded by atmospheric pressure, merely a moisture-tight sealing of the booster charge and, respectively, of the ignition chamber against the environment of the hybrid inflator is necessary, whereas a gas-tight sealing is not required in this case.

In a preferred embodiment of the hybrid inflator according to the invention, the combustion chamber includes a combustion chamber base delimiting the propellant charge along the longitudinal axis. Preferably, the combustion chamber base is adjacent to a or, respectively, the second plane which delimits the propellant charge at its end facing away from the igniter. Especially, the propellant charge may be formed of propellant pellets and/or propellant rings. This arrangement including the combustion chamber base offers the advantage that the combustion chamber base may be used for axially supporting the propellant charge. Even if the propellant charge itself is accommodated in a separate casing, for example a cage, the combustion chamber base has such supporting effect.

In a further preferred configuration, the bursting element holder, especially the ignition chamber which is at least in portions delimited by the bursting membrane holder, extends substantially completely through the combustion chamber. In this way, the volume available inside the compressed gas tank is optimally exploited and it is simultaneously ensured that the shock wave being formed by bursting of the first bursting element is only triggered downstream of the propellant charge. At the same time, a comparatively large ignition chamber is provided which may be filled with the booster charge in variable density. Thus, the options of setting the performance of the hybrid inflator are increased.

Further variants of the present invention may provide that a deflector having a central through hole is arranged in the axial longitudinal direction of the hybrid inflator starting from the igniter behind the combustion chamber. The deflector causes the ignition gas released by the booster charge to be deflected and in this way improves the burn-off of the propellant charge. The central through hole helps to achieve that the shock wave triggered may propagate unhindered up to the second bursting element.

Concretely, a ring-shaped bulge may be provided to be formed in the deflector. The ring-shaped bulge may be designed so that ignition gas released by the booster charge can be deflected radially outwardly or along a longitudinal axis opposite to the axial longitudinal direction. This is advantageous especially when the propellant charge is arranged coaxially around the ignition chamber. The shock wave triggered behind the propellant charge may pass substantially unhindered through the central through hole of the deflector. The released ignition gas, in contrast, is deflected via the ring-shaped bulge to the outside and along the longitudinal axis opposite to the axial longitudinal direction so that the propellant charge in the combustion chamber burns off opposite to the axial longitudinal direction toward the igniter. This is of advantage even when a relatively large airbag has to be filled for the filling operation of which a quite long period of time is available. Then a comparatively slow burn-off of the propellant is advantageous to obtain filling of the airbag.

The propellant charge may include propellant pellets and/or propellant rings. The use of propellant pellets offers the advantage that between the individual propellant pellets a comparatively large volume capable of being filled by compressed gas is retained. In contrast to this, when using propellant rings a larger volume and, respectively, a larger mass of propellant can be accommodated within the combustion chamber.

Preferably the propellant pellets are arranged inside a ring-shaped cage. The case ensures that the propellant pellets remain at their predetermined positions. At the same time, openings in the case, on the one hand, cause the propellant pellets to be easily ignited and, on the other hand, cause the gas released by the propellant pellets to quickly escape from the combustion chamber.

In a preferred configuration of the invention, the ignition chamber or the bursting element holder extends through a central through-hole of the cage and/or of the propellant rings. In this manner, the booster charge may be arranged substantially coaxially inside the propellant charge. This is beneficial to a compact design.

The second bursting element preferably is arranged at a rear end of the compressed gas tank. Especially, in preferred embodiments the second bursting element is provided to close an opening disposed coaxially with respect to a longitudinal axis of the compressed gas tank and to be held by a further second bursting element holder which is tightly connected, especially welded, to the compressed gas tank. The coaxial arrangement of the second bursting element with respect to the longitudinal axis of the compressed gas tank guarantees that the shock wave triggered by the igniter and the booster charge arrives at the second bursting element substantially unhindered and thus the compressed gas tank will be opened and the compressed gas arranged therein will be released in an optimum way.

One independent aspect of the invention relates to a gas bag unit, especially airbag unit, tor a vehicle safety system comprising an afore-described hybrid inflator. Furthermore, according to one independent aspect the invention relates to a vehicle safety system comprising such hybrid inflator or such airbag unit.

Within the scope of the present invention, equally a method of forming a shock wave within a hybrid inflator is disclosed and claimed. The method may preferably be employed in a hybrid inflator which includes the afore-mentioned design features. The method according to the invention comprises the following steps of:

a) activating an igniter; then
b) igniting a booster charge arranged downstream of the igniter in the axial longitudinal direction of the hybrid inflator and disposed in an ignition chamber; after that
c) opening a bursting element of the ignition chamber by at least partially burning off the booster charge so as to generate a shock wave; and after that
d) igniting a propellant charge inside a combustion chamber which is fluid-communicated with the opened ignition chamber.

The afore-mentioned method steps preferably will be carried out in the shown order, with the entire process taking few milliseconds. It is a basic idea of the method according to the invention to generate the shock wave first by at least partly burning off the booster charge, with the booster charge having been ignited by the igniter before. Substantially the point in time of triggering the shock wave constitutes a peculiarity of the method according to the invention. Concretely, the shock wave preferably is generated only after the igniter and the booster charge have been ignited but before or simultaneously with the ignition of a propellant charge.

In a preferred variant, it is concretely provided that the shock wave is generated or will form in the axial longitudinal direction of the hybrid inflator between a first plane delimiting the propellant charge at its end facing the igniter and a second plane delimiting the propellant charge at its end facing away from the igniter or only in the axial longitudinal direction downstream of a propellant charge arranged in the combustion chamber.

BRIEF DESCRIPTION OF THE DRAWINGS

Hereinafter the invention shall be illustrated in detail by way of embodiments with reference to the enclosed schematic Figures, wherein:

FIG. 1 shows a sectional view across a hybrid inflator according to the invention in accordance with a preferred embodiment, with the first bursting element being arranged between longitudinal ends of a propellant charge;

FIG. 2 shows a sectional view across a hybrid inflator according to the invention in accordance with another embodiment, with the ignition chamber completely extending through the combustion chamber;

FIG. 3 shows a sectional view across a hybrid inflator according to the invention in accordance with another preferred embodiment, with the first bursting element being arranged between longitudinal ends of the propellant charge which are formed by propellant rings; and FIG. 4 shows a sectional view across a hybrid inflator according to the invention in accordance with another preferred embodiment, with the propellant charge being formed by propellant rings through which the ignition chamber completely extends.

DESCRIPTION

Each of the attached Figures illustrates a sectional view across a hybrid inflator according to the invention, wherein the embodiments according to FIGS. 1 and 2 differ from the embodiments according to FIGS. 3 and 4 by the type of the propellant charge 18.

In general, the hybrid inflator includes a compressed gas tank 20 which has a substantially tubular shape. The compressed gas tank 20 comprises a crimping 28 serving as a stop for a component delimiting a combustion chamber 16, especially a combustion chamber base 19 or a deflector 25. Proximally from the crimping 28 the combustion chamber 16 is disposed. Moreover, in said proximal portion of the compressed gas tank 20 an igniter 10 is positioned. The structure of the igniter 10 and of the compressed gas tank 20 will be described in the following.

The igniter 10 is held in an igniter support 11 and includes two pins 12. The pins 12 enable the igniter 10 to be electrically connected to a power source and, respectively, a controller so that the igniter 10 can be electrically triggered. Within the igniter 10 the two pins 12 are coupled to each other via a bridge wire (not shown) which immediately contacts a pyrotechnical charge stored inside the igniter 10. The pyrotechnical charge is ignited by an electric current pulse causing the bridge wire to glow. The igniter support 11 in this case is a closure member of the hybrid inflator and, respectively, of the compressed gas tank 20 and closes a front end of the tubular compressed gas tank 20 in a gas-tight manner by means of a radially peripheral welding.

As regards the igniter 10, a second pyrotechnical igniter charge may be provided in addition to a first pyrotechnical igniter charge. Both of said pyrotechnical igniter charges are located within the igniter 10 which is known to be a separate pre-assembled component.

in the axial longitudinal direction (A) of the hybrid inflator and, respectively, of the compressed gas tank 20 an ignition chamber 30 is connected to the igniter 10. The ignition chamber 30 is delimited, on the one hand, by an end face of the igniter 10 and, on the other hand, by a bursting element holder 13 including a first bursting element 14. inside the ignition chamber 30 a booster charge 15 is arranged. The booster charge 15 may be formed, for example, by granules having a grain size ranging preferably from 400 μm to 2000 μm or by preferably cylindrical pellets ranging in diameter e.g. from 15 mm to 10 mm and a corresponding height ranging e.g. from 0.75 mm to 5 mm. in addition, or as an alternative, also extrudate molds with or without axial through-passages are imaginable as booster charge 15. In any case, the booster charge 15 comprises a propellant which may be gas-generating at least in part and/or may generate even hot particles in the case of its burn-off.

The first bursting element 14 which is supported by the bursting element holder 13 is arranged coaxially with respect to the igniter 10. The first bursting element 14 is welded into the bursting element holder 13 or is connected to the bursting element holder 13 by welding, respectively.

The first bursting element 14 is preferably designed as a bursting disk. The first bursting element 14 is configured so that if ruptures under pressure and releases an opening so that ignition gas may escape from the ignition chamber 30. For this purpose, the bursting disk may include appropriate predetermined breaking points in the form of notches or areas of weakened material, for example.

The first bursting element 14 has the function, inter alia, to separate the ignition chamber 30 from the combustion chamber 16 and, respectively, the compressed gas tank 20 in a fluid-tight or gas-tight manner. In this way, different pressures may be prevailing in the ignition chamber 30 and in the compressed gas tank 20, it is preferably provided that in the ignition chamber 30 atmospheric pressure is prevailing, whereas in the compressed gas tank 20 and in the combustion chamber 16 pressurized compressed gas is disposed.

The ignition chamber 30 and, respectively, the bursting element bolder 13 extend into the combustion chamber 16. The combustion chamber 16 is formed by a tubular portion of the compressed gas tank 20. Within the combustion chamber 16 a cage 17 is arranged in the embodiments according to FIGS. 1 and 2. The cage 17 is substantially ring-shaped or tube-shaped and includes a central through-passage 31. The ignition chamber 30 extends info the central through-passage 31

Inside the cage 17 a propellant charge 18 is disposed, in the embodiments according to FIGS. 1 and 2, the propellant charge 18 is constituted by a plurality of propellant pellets 18a. The propellant pellets are arranged substantially at random inside the cage 17 so that a free volume forms between the propellant pellets 18a. Since the combustion chamber 16 is fluid-communicated in total with the compressed gas tank 20, the free volume between the propellant pellets 18 may accommodate compressed gas disposed in the compressed gas tank 20. in other words, the propellant pellets 18a are surrounded by the compressed gas being retained inside the compressed gas tank 20.

It applies to all embodiments illustrated in the drawings that the igniter 10, the ignition chamber 30 and the bursting element bolder 13, respectively, and the first bursting element 14 may be arranged substantially coaxially within the compressed gas tank 20. A second bursting element 24 which is held at the distal end of the compressed gas tank 20 in a further second bursting element holder 23 may be disposed equally coaxially within the compressed gas tank. The second bursting element 24 preferably equally takes the shape of a bursting disk. The second bursting disk may be configured substantially analogously to the first bursting disk.

The connection between the further second bursting element holder 23 and the compressed gas tank 20 is preferably established by welding. In particular, the further second bursting element holder 23 may be tightly connected to the compressed gas tank 20 by capacitor discharge welding. Proximally with respect to the second bursting element 24, a filter 29 extends from the further second bursting element holder 23 info the interior of the compressed gas tank 20.

Moreover, a diffusor 22 is attached to the distal end of the compressed gas tank 20, The diffusor 22 may be connected to the compressed gas tank 20 by crimping. The diffusor 22 substantially forms a bulged cap having lateral outlet openings for the compressed gas disposed in the compressed gas tank 20 as well as for the burn-off gas additionally generated by the propellant charge 18.

In order to prevent the propellant charge 18 from being inadvertently ignited in the combustion chamber 16 during welding of the further second bursting element holder 23 with the compressed gas tank 20 in the embodiments according to FIGS. 1 and 3, a weld-protection cover 21 is provided at the combustion chamber base 19 as spark protection. The weld-protection cover 21 is arranged on the combustion chamber base 19 and covers the through-passage 31. This prevents sparks during welding of the further second bursting element holder 23 from getting in contact with the propellant charge 18.

The weld-protection cover 21 is not constituted by a conventional tamping glued onto the combustion chamber base 19. Rather, the weld-protection cover 21 is provided to be flexible and/or permeable as regards gas permeability so as to allow for pressure compensation between the pressure tank 20 and the combustion chamber 16. The weld-protection cover 21 itself may be flexible or may at least be flexibly supported.

As is evident from the Figures, between the igniter 10 and the first bursting element 14 and, respectively, the first bursting disk the ignition chamber 30 containing the booster charge 15 is arranged. The booster charge 15 may be an ignition mixture of an ignition propellant, for example. A shock wave SW required for opening the second bursting element 24 is triggered by tearing or rupturing the first bursting element 24. The first bursting element 14 is dimensioned or tailored to the igniter 10 and the booster charge 15 so that the first bursting element 14 ruptures only when both the igniter 10 and the booster charge 15 have been ignited and a corresponding pressure has been built up within the ignition chamber 30. The shock wave SW may be triggered within the combustion chamber 16. Especially, the shock wave SW may form between the longitudinal ends of the propellant charge 18, as it is the case in the embodiments according to FIGS. 1 and 3, for example. The ignition chamber 30 extends to no more than approximately half of the propellant charge 18 into the through-passage 31. In any case, the shock wave SW does not pass through the entire through-passage 31 but forms inside the through-passage 31. The shock wave SW may form at approximately half the length of the through-passage 31.

In the embodiments according to FIGS. 1 and 3, the shock wave SW forms in the axial longitudinal direction A of the hybrid inflator between a first plane E1 delimiting the propellant charge 18 at its end facing the igniter 10 and a second plane E2 delimiting the propellant change 18 at its end facing away from the igniter 10.

In other words, the propellant charge 18 has a beginning viewed from the igniter 10 in the axial longitudinal direction A which is delimited by the first plane E1 and it has an end which is delimited by the plane E2, with the two planes E1 and E2 being aligned perpendicularly to the axial longitudinal direction A. In accordance with FIGS. 1 and 3, between the beginning and the end of the propellant charge 18 the shock wave SW can be triggered or initiated, preferably only when both the igniter 10 and the booster charge 15 have been ignited before.

The embodiments according to FIGS. 2 and 4 differ mainly as to their structural design from the embodiments according to FIGS. 1 and 3 in that the ignition chamber 30 and the bursting element holder 13, respectively, completely extend through the through-passage 31 and a deflector 25 is arranged in the area of the crimping 28. The deflector 25 may be a metal deflector, for example. Preferably the deflector 25 includes a ring-shaped bulge 26 and a through-hole 27. The ring-shaped bulge 28 extends around the through-hole 27. In other words, the through-hole 27 is arranged coaxially inside the ring-shaped bulge 26. The bulge 26 is aligned so that the deflector 25 in total extends convexly in the axial longitudinal direction (A) of the hybrid inflator. The deflector 25 is arranged coaxially with respect to the longitudinal axis of the compressed gas tank 20.

In the embodiments according to FIGS. 2 and 4, the shock wave SW forms only downstream of the propellant charge 18 or starting from the afore-described second plane E2 which delimits the propellant charge 18 at its end facing away from the igniter 10. Concretely, the first bursting element 14 may be arranged in the plane E2 which may also be understood to be a virtual delimitation for the propellant charge 18. In other words, the propellant charge 18 and, respectively, the combustion chamber 16 end at said plane E2 which is aligned perpendicularly to the axial longitudinal direction A of the compressed gas tank 20. In this way, the shock wave is ensured to form as late as in or from said plane E2 or in the axial longitudinal direction (A) downstream of said plane E2. Accordingly, the shock wave SW preferably will form only when both the igniter 10 and the booster charge 15 have been ignited before.

The through-hole 27 is provided in order to allow the shock wave passing the deflector 25 unhindered. Preferably the through-hole 27 is dimensioned so that its diameter substantially corresponds to the diameter of the first bursting element 14. The through-hole 27 in this respect is aligned to be coaxial and parallel to the first bursting disk 14, After being formed at the end of the propellant charge 18, the shock wave extends toward the deflector 25. The shock wave SW passes the deflector 15 through the through-hole 27. Subsequently the shook wave SW propagates through the compressed gas tank 20. Then the shock wave SW impinges on the filter 29 and the second bursting element 24 disposed there behind. The increase in pressure caused by the shock wave SW in the area of the second bursting element 24 ensures that the second bursting element 24 ruptures and thus an outlet opening for the compressed gas is released in the compressed gas tank 20.

By its ring-shaped bulge 28, the deflector 25 causes burn-off gas escaping from the ignition chamber 30 after opening of the first bursting element 14 to be deflected along the longitudinal axis and to be returned to the combustion chamber 16. After deflection by the metal deflector 25 the burn-off gas thus flows through the combustion chamber 16 opposite to the axial longitudinal direction A and ignites the propellant charge 18. In so far, the propellant charge 18 is arranged coaxially around the ignition chamber 30.

It is worth mentioning that the deflector 25 has the ring-shaped bulge 26 in the idle state already. Although additional deformation by the impact of pressure upon activation of the hybrid inflator is not excluded, such additional deformation is not necessary, however, to obtain the desired deflection of the ignition gas.

The embodiments according to FIGS. 3 and 4 differ from the embodiments according to FIGS. 1 and 2 merely by the type of propellant charge. In the embodiments according to FIGS. 1 and 2, the propellant charge 18 is constituted by propellant pellets 18a which are arranged at random in a cage 17. In the embodiments according to FIGS. 3 and 4, a cage 17 is dispensable as the propellant charge 18 is constituted by propellant rings 18b. The propellant rings 18b likewise form a through-passage 31 which is defined already by the shaping of the propellant rings 18b. The propellant rings 18b at least partially surround the ignition chamber 30 and the bursting element holder 13, respectively. In other words, the bursting element holder 13 and, respectively, the ignition chamber 30 extend through the through-passage 31 which is delimited by an inner circumferential area of the propellant rings 18b being stacked along the longitudinal axis and, respectively, arranged adjacent to each other.

In the embodiments according to FIGS. 1 and 3, the shock wave SW is formed inside the combustion chamber 16, especially inside the through-passage 31. In any case, in all embodiments the shock wave SW is formed only after, in addition to the igniter 10, the booster charge 15 has been activated and ignited, respectively. Only the ignition of the booster charge 15 does cause sufficiently high increase in pressure inside the ignition chamber 30 so that the first bursting element 14 ruptures, in the embodiments according to FIG. 2 and 4, the shock wave is provided to be triggered only downstream of the propellant charge 18, especially downstream of the through-passage 31.

LIST OF REFERENCE NUMERALS 10 igniter
11 igniter carrier
12 pin
13 bursting element holder
14 first bursting element
15 booster charge
16 combustion chamber
17 cage
18 propellant charge
18a propellant pellet
18b propellant ring
19 combustion chamber base
20 compressed gas tank
21 weld-protection cover
22 diffusor
23 further second bursting element holder
24 second bursting element
25 deflector
26 bulge
27 through-hole
28 crimping
28 filter
30 ignition chamber
31 through-passage
SW shock wave
A axial longitudinal direction
E1 first plane
E2 second plane

The invention claimed is:

1. A hybrid inflator, especially for a vehicle safety system, having an axial longitudinal direction (A) and comprising:
an igniter (10),
a combustion chamber (16) including a propellant charge (18) which is separated from the igniter (10) by a first bursting element (14) held by a bursting element holder (13) with the propellant charge (18) being located outside the bursting element holder (13), and comprising
a compressed gas tank (20) filled with compressed gas which includes at least one discharge opening, with the at least one discharge opening being closed by a second bursting element (24) and the compressed gas tank (20) being fluid-communicated with the combustion chamber (16) so that the compressed gas surrounds the propellant charge (18),
wherein the bursting element holder (13) at least in portions delimits an ignition chamber (30) containing a booster charge (15) that contacts the bursting element holder (13) and the igniter (10) prior to activation of the igniter (10), the first bursting element (14) separating the ignition chamber (30) from the combustion chamber (16), wherein a shock wave (SW) for opening the second bursting element (24) can be formed only when both the igniter (10) and the booster charge (15) have been ignited and activated, wherein the ignition chamber (30) which is delimited at least in portions by the bursting element holder (13) extends substantially completely through the combustion chamber (16).

2. The hybrid inflator according to claim 1, wherein the first bursting element (14) is arranged so that a shock wave (SW) capable of being triggered by the igniter (10) and the booster charge (15) can be initiated and triggered in the axial longitudinal direction (A) of the hybrid inflator only downstream of the propellant charge (18) or starting from a second plane (E2) delimiting the propellant charge (18) at its end facing away from the igniter (10).

3. The hybrid inflator according to claim 1, wherein the bursting element holder (13) including the first bursting element (14) and at least one end face of the igniter (10) define the ignition chamber (30) in which the booster charge (15) exposed to atmospheric pressure prior to activation of the igniter (10) is accommodated.

4. The hybrid inflator according to claim 1, wherein the propellant charge (18) comprises propellant pellets (18a) arranged within a ring-shaped cage (17), with the ignition chamber (30) or the bursting element holder (13) preferably extending through a central through-passage (31) of the cage (17).

5. A vehicle safety system comprising a hybrid inflator according to claim 1.

6. The hybrid inflator according to claim 1, wherein the booster charge is separate from the igniter.

7. The hybrid inflator according to claim 1, wherein the first bursting element closes an end of the bursting element holder that is opposite the igniter.

8. The hybrid inflator according to claim 1, wherein the ignition chamber is delimited by the igniter and the first bursting element.

9. The hybrid inflator according to claim 1, wherein the igniter is exposed to the booster charge prior to activation of the igniter.

10. The hybrid inflator according to claim 1, wherein the first and second bursting elements are located at opposite longitudinal ends of the compressed gas tank and exposed to the compressed gas prior to activation of the igniter.

11. The hybrid inflator according to claim 1, wherein a shock wave (SW) triggered by the igniter and booster charge travels through the compressed gas in the compressed gas tank prior to rupturing the second bursting element.

12. The hybrid inflator according to claim 1, wherein the compressed gas contacts the propellant charge prior to activation of the igniter.

13. A gas bag unit, especially airbag unit, for a vehicle safety system comprising a hybrid inflator according to claim 1.

14. A vehicle safety system comprising an airbag unit according to claim 13.

15. A method of forming a shock wave within a hybrid inflator according to claim 1, the method comprising the following steps of:
   a) activating the igniter (10); then
   b) igniting the booster charge (15) arranged downstream of the igniter (10) in the axial longitudinal direction (A) of the hybrid inflator and arranged in the ignition chamber (30); after that
   c) opening a bursting element of the ignition chamber by at least partly burning off the booster charge so that a shock wave (SW) is generated; and after that
   d) igniting the propellant charge (18) within the combustion chamber (16) which is fluid-communicated with the opened ignition chamber (30).

16. The method according to claim 15, wherein the shock wave (SW) is generated or forms in the axial longitudinal direction (A) of the hybrid inflator downstream of the propellant charge (18) arranged in the combustion chamber (16).

17. A hybrid inflator, especially for a vehicle safety system, having an axial longitudinal direction (A) and comprising:
   an igniter (10),
   a combustion chamber (16) including a propellant charge (18) which is separated from the igniter (10) by a first bursting element (14) held by a bursting element holder (13) with the propellant charge (18) being located outside the bursting element holder (13), and comprising
   a compressed gas tank (20) filled with compressed gas which includes at least one discharge opening, with the at least one discharge opening being closed by a second bursting element (24) and the compressed gas tank (20) being fluid-communicated with the combustion chamber (16) so that the compressed gas surrounds the propellant charge (18),
   wherein the bursting element holder (13) at least in portions delimits an ignition chamber (30) containing a booster charge (15) exposed to the bursting element holder (13) prior to activation of the igniter (10), the first bursting element (14) separating the ignition chamber (30) from the combustion chamber (16), wherein a shock wave (SW) for opening the second bursting element (24) can be formed only when both the igniter (10) and the booster charge (15) have been ignited and activated,
   wherein the first bursting element (14) is arranged so that a shock wave (SW) capable of being triggered by the igniter (10) and the booster charge (15) can be initiated and triggered in the axial longitudinal direction (A) of the hybrid inflator between a first plane (E1) delimiting the propellant charge (18) at its end facing the igniter (10) and a second plane (E2) delimiting the propellant charge (18) at its end facing away from the igniter (10), and
   wherein the axial longitudinal direction (A) of the hybrid inflator, starting from the igniter (10), a deflector (25) including a central through-hole (27) is arranged behind the combustion chamber (16), wherein a ring-shaped bulge (26) is formed in the deflector (25) so that ignition gas released by the booster charge (15) can be deflected radially outwardly and/or along the longitudinal axis opposite to the axial longitudinal direction (A).

* * * * *